(12) United States Patent
Ziehm et al.

(10) Patent No.: US 9,021,765 B2
(45) Date of Patent: May 5, 2015

(54) MOLDED POLYMERIC SPACING DEVICES

(75) Inventors: Mark W. Ziehm, Rochester Hills, MI (US); Michael J. Radlick, III, Sterling Heights, MI (US); Lawrence R. Weber, Lawson, MO (US)

(73) Assignee: Hankel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/684,471

(22) Filed: Jan. 8, 2010

(65) Prior Publication Data

US 2010/0172691 A1 Jul. 8, 2010

Related U.S. Application Data

(63) Continuation of application No. PCT/US2008/008608, filed on Jul. 15, 2008.

(60) Provisional application No. 60/950,923, filed on Jul. 20, 2007.

(51) Int. Cl.
| | |
|---|---|
| *F16B 21/06* | (2006.01) |
| *F16B 19/02* | (2006.01) |
| *B60R 13/02* | (2006.01) |
| *F16B 21/08* | (2006.01) |
| *B60R 13/08* | (2006.01) |

(52) U.S. Cl.
CPC ............. *F16B 19/02* (2013.01); *B60R 13/0206* (2013.01); *B60R 13/08* (2013.01); *F16B 21/084* (2013.01); *F16B 21/086* (2013.01); *F16B 21/088* (2013.01)

(58) Field of Classification Search
USPC ................. 52/787.12, 716.5, 718.01, 718.04, 52/718.05, 718.06, 745.21; 403/345; 24/297; 411/508–510
See application file for complete search history.

(56) References Cited

U.S. PATENT DOCUMENTS

| | | | | |
|---|---|---|---|---|
| 5,419,606 | A | * | 5/1995 | Hull et al. ................... 296/146.7 |
| 5,647,713 | A | * | 7/1997 | Ge et al. .......................... 411/509 |
| 5,797,714 | A | | 8/1998 | Oddenino |
| 5,857,244 | A | * | 1/1999 | Edwards et al. ................. 24/297 |

(Continued)

FOREIGN PATENT DOCUMENTS

| | | |
|---|---|---|
| JP | 07-217686 A | 8/1995 |
| JP | 08-210333 A | 8/1996 |

(Continued)

OTHER PUBLICATIONS

International Search Report dated Jan. 14, 2009, International application PCT/US2008/008608.

(Continued)

*Primary Examiner* — William Gilbert
(74) *Attorney, Agent, or Firm* — Mary K. Cameron

(57) ABSTRACT

Substrates such as sheet metal components may be kept spaced apart from each other using a molded polymeric spacing device. The spacing device has a main body with a thickness corresponding to the desired minimum spacing between the substrates and, extending from the main body or a base connected to said main body, an attachment member capable of being inserted into an opening in one of the substrates, but resistant to being easily withdrawn from such opening. Noise and vibration that might otherwise be generated or propagated by closely proximate substrates are reduced through the use of such molded polymeric spacing devices, which may be integrally fashioned from a rubber.

18 Claims, 4 Drawing Sheets

(56) References Cited

U.S. PATENT DOCUMENTS

| | | | |
|---|---|---|---|
| 6,916,145 B2 * | 7/2005 | Lydan | 411/510 |
| 7,198,315 B2 * | 4/2007 | Cass et al. | 296/29 |
| 2002/0014712 A1 * | 2/2002 | Meguriya | 264/49 |
| 2004/0081533 A1 | 4/2004 | Behle et al. | |
| 2008/0066266 A1 * | 3/2008 | Scroggie et al. | 24/297 |

FOREIGN PATENT DOCUMENTS

| | | | |
|---|---|---|---|
| JP | 11-346809 A | 12/1999 | |
| KR | 10-0173610 | 5/1999 | |
| KR | 10-0173610 B1 | 5/1999 | |
| KR | 10-2004-0073358 A | 8/2004 | |

OTHER PUBLICATIONS

Written Opinion dated Jan. 14, 2009, International application PCT/US2008/008608.

Second Office Action Issued by the Mexican Patent Office for Application No. MX/a/2010/000730 Dated Oct. 24, 2013.

* cited by examiner

MOLDED POLYMERIC SPACING DEVICES

This application is a continuation under 35 U.S.C. Sections 365(c) and 120 of International Application No. PCT/US2008/008608, filed Jul. 15, 2008 and published on Jan. 29, 2009 as WO 2009/014611, which claims priority from U.S. Provisional Patent Application Ser. No. 60/950,923 filed Jul. 20, 2007, which are incorporated herein by reference in their entirety.

FIELD OF THE INVENTION

The invention relates to methods and devices useful for maintaining a desired spacing between two substrates, such as sheet metal components of a vehicle.

DISCUSSION OF THE RELATED ART

In the assembly of certain articles such as automotive vehicles, there is frequently a need to maintain a desired spacing between the surfaces of two substrates. Without such spacing, the two substrate surfaces may come into contact with each other, thereby creating the opportunity for noise or vibration to be generated, transmitted or magnified. One approach to solving this problem has been to apply an extruded and die cut rubber spacer between the substrates using a double sided pressure sensitive tape or tacky mastic to affix the rubber spacer to one of the substrate surfaces. However, assembly of such a spacer device is relatively complex and care must be taken to ensure that the adhesive bond between the spacer device and the substrate surface remains secure when the assembled article (e.g., automobile) is placed in use and subjected to vibration and temperature extremes. An alternative approach is to equip the rubber spacer with a separate mechanical fastener such as a pin, clip or rivet capable of attaching the spacer device to one of the substrates. Manufacture of such a spacer device is relatively complicated and costly, however.

BRIEF SUMMARY OF THE INVENTION

The present invention provides a molded polymeric spacing device useful for maintaining a desired minimum spacing between a first substrate having an opening therein, said molded polymeric spacing device comprising a main body with a thickness corresponding to said desired minimum spacing and a width effective to prevent entry of the main body into said opening in said first substrate and an attachment member capable of being inserted into said opening in said first substrate but offering resistance to withdrawal from said opening, said main body and said attachment member being integral with each other. "Integral" in the context of the present invention means that elements are connected (although not necessarily directly connected) in a continuous manner, rather than being formed as separate pieces and then joined together.

Also provided by the invention is a method of maintaining a desired minimum spacing between a first substrate and a second substrate and/or damping noise or vibration arising from said first substrate and/or said second substrate, said method comprising:

a). providing an opening in said first substrate;

b). providing a molded polymeric spacing device, said molded polymeric spacing device comprising a main body with a thickness corresponding to said desired minimum spacing and a width effective to prevent entry of the main body into said opening in said first substrate and an attachment member capable of being inserted into said opening in said first substrate but offering resistance to withdrawal from said opening, said main body and said attachment member being integral with each other;

c). inserting said attachment member into said opening in said first substrate; and d). placing said second substrate in proximity to said first substrate, with said main body positioned between said first substrate and said second substrate.

An assembly comprising a first substrate having an opening and a second substrate with a desired minimum spacing maintained between said first substrate and said second substrate is further provided by the present invention, wherein:

a). said assembly further comprises a molded polymeric spacing device comprising a main body with a thickness corresponding to said desired minimum spacing and a width effective to prevent entry of the main body into said opening in said first substrate and an attachment member inserted into said opening in said first substrate and offering resistance to withdrawal from said opening, said main body and said attachment member being integral with each other; and b). said second substrate is proximate to said first substrate, with said main body positioned between said first substrate and said second substrate.

DETAILED DESCRIPTION OF CERTAIN EMBODIMENTS OF THE INVENTION

Figure 1:
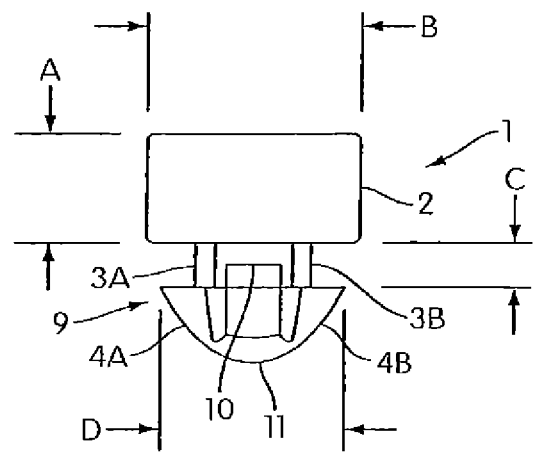
FIG. 1 is a front view of one embodiment of a molded polymeric spacing device in accordance with the present invention.
Figure 2:
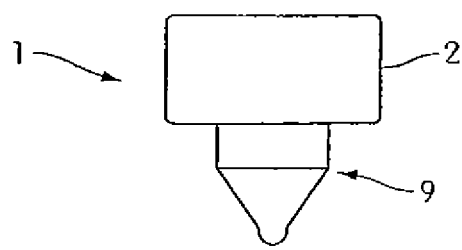
FIG. 2 is a side view of the molded polymeric spacing device of FIG. 1.
Figure 3:
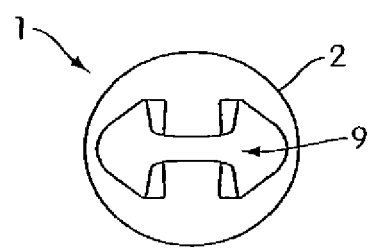
FIG. 3 is a bottom view of the molded polymeric spacing device of FIG. 1.

The molded polymeric spacing devices of the present invention may be fabricated from any polymeric material capable of being molded into the desired shape. It is particularly preferred to use a single polymeric material for the entire spacing device in order to simplify the manufacturing process, although in certain embodiments more than one such polymeric material may be employed (the term "polymeric material" includes materials that are blends or admixtures of two or more components or ingredients). For example, the main body may be comprised of one polymeric material, with the attachment member being comprised of a different polymeric material.

The polymeric material may comprise one or more polymers, which may be thermoplastic or thermoset in character.

In an especially preferred embodiment, the polymer is a rubber (elastomer) such as a thermoplastic elastomer or crosslinked or crosslinkable rubber.

Suitable rubbery (elastomeric) polymers include, for example, natural rubber, isoprene rubbers, butadiene rubbers, chloroprene rubbers, butyl rubbers, nitrile-butadiene rubbers, styrene-butadiene rubbers, ethylene-propylene copolymer rubbers, ethylene-propylene-diene monomer (EPDM) rubbers, acrylic elastomers, thermoplastic urethane elastomers, styrene-diene thermoplastic block copolymers, thermoplastic copolyester-ether elastomers, ethylene-alpha-olefin copolymers (in particular, copolymers formed by metallocene copolymerization of ethylene and one or more alpha-olefin comonomers, including the materials sometimes referred to as "plastomers"), polysiloxane rubbers (polysilicone rubbers) and the like. In certain embodiments, the use of polymers that are essentially or completely saturated is preferred.

The polymer or polymers may be formulated together with one or more fillers, stabilizers, pigments, plasticizers, curing agents (crosslinking agents, vulcanizing agents), and the like to provide the polymeric material used to prepare the molded polymeric spacing device.

The polymeric material used to fabricate the molded polymeric spacing devices of the present invention may, in one embodiment, be heat expandable, that is, capable of being expanded (foamed) when heated. An expandable polymeric material may help to seal off the opening in the substrate into which the attachment member has been inserted and/or help to further secure the spacing device in the desired position and/or advantageously modify the noise and vibration damping characteristics of the spacing device. The use of an expandable polymeric material also permits the use of a molded polymeric spacing device that initially has a thickness less than the minimum substrate spacing that is desired. The spacing device is attached to a first substrate by inserting the attachment member into an opening in the substrate and a second substrate positioned near the first substrate with the main body between the substrates, the two substrates being spaced apart from each other at the desired minimum spacing. The spacing device is then heated to a temperature effective to activate a blowing agent present in the polymeric material. The main body expands in volume such that the surface of the main body opposite that of the attachment member conies into contact with the second substrate. The polymeric material may be rendered expandable through the incorporation of one or more blowing agents. Selection of the blowing agent or blowing agents is not believed to be particularly critical, with both chemical blowing agents as well as physical blowing agents being suitable and with latent (heat-activated) blowing agents being particularly preferred. Preferred blowing agents include expandable hollow plastic microspheres, wherein a shell comprised of a polymer such as a polyvinylidene chloride copolymer or an acrylonitrile/(meth)acrylate copolymer encapsulates a volatile blowing agent such as a lower alkyl hydrocarbon. Any of the chemical blowing agents known in the art may also be employed, such, as for example, azo compounds (e.g., azodicarbonamide), hydrazides (e.g. sulfonylhydrazides), and the like. The activation temperature of the blowing agent is preferably selected in coordination with the softening temperature of the polymeric material used for the main body, so that the foaming is induced at a temperature where the main body is sufficiently soft so as to permit controlled expansion of the melt flowable material. However, it will generally be desirable to select a blowing agent that is not activated at the temperature at which the polymeric material is to be shaped into the spacing device (e.g., by injection molding).

In preferred embodiments of the invention, the polymeric material used to prepare the molded polymeric spacing device is resilient and non-brittle, as such characteristics facilitate the design of attachment members which are capable of being inserted into an opening in a substrate but which offer resistance to withdrawal from the opening. These characteristics also are desirable where the molded polymeric spacing device is being utilized for the purpose of helping to reduce the level of noise or vibration that may otherwise be generated between two substrates (such as two sections of sheet metal) that are in close proximity to each other.

The spacing devices of the present invention may be shaped or formed using any suitable molding method, including, but not limited to, injection molding, compression molding, extrusion molding or other molding techniques. For example, granules of a suitable polymeric material may be placed into a hopper that feeds into a heated injection unit. A reciprocating screw pushes the granules through a heating chamber, where the granules are softened to a flowable state. At the end of this chamber there is a nozzle that abuts firmly against an opening into a relatively cool, closed mold having a cavity with the same dimensions as the desired spacing device. The heated polymeric material is forced at high pressure through the nozzle into the mold cavity. A series of clamps holds the mold halves together. Once the material has cooled to a solid state, the mold is opened and the injection molded spacing device ejected. If the polymeric material is to be cured or crosslinked by heating, such curing or crosslinking may be accomplished by maintaining the polymeric material in the heated mold at the desired crosslinking/curing temperature for an effective period of time. Curing/crosslinking of the molded polymeric spacing device may also be carried out after the spacing device has been removed from the mold, although the conditions should be controlled so that the spacing device does not become significantly distorted during such post-mold heating.

FIG. 1 is a side view of one embodiment of a molded polymeric spacing device (1) in accordance with the present invention that comprises a main body (2) and an attachment member (9). The spacing device may be injection molded as a single piece from a rubber such as ethylene propylene diene monomer (EPDM) rubber. The main body (2) has a thickness (A) corresponding to the minimum spacing which is desired to be maintained between the two substrates between which the main body (2) will be positioned when in use. The width (B) of the main body is larger than the width of the opening into which the attachment member (9) will be inserted, thereby preventing the main body (2) from passing through such opening. The main body, as viewed from above (i.e., the side opposite the side on which the attachment member is attached), may be of any suitable shape including, for example, round, rectangular, square, oval, dumbbell-shaped, cross-shaped, star-shaped, hexagonal, trapezoidal, or irregular in shape. Although the main body (2) illustrated in FIG. 1 has generally straight sides (i.e., sides substantially perpendicular to the plane of the substrate surface to which the spacing device is affixed), the main body sides could alternatively take other forms such as curved (in a concave or convex manner), tapered, notched, angled or the like. The attachment member (9) in this particular embodiment of the invention has two prongs (3A, 3B) which extend from the main body (2) and which are capable of being elastically compressed toward each other (meaning that the prongs may be squeezed together at their ends but then return to their original orientation when released). The prongs may extend from a base attached to the main body rather than directly from the main body, where the base has dimensions which permit it to enter the substrate opening into which the attachment member is inserted. In one embodiment, such base is sized so as to block substantially the entire opening. Barbs (4A, 4B) are present at the end of each of the prongs (3A, 3B); these barbs (4A, 4B) assist in holding the spacing device (1) in position once the attachment member (9) has been inserted into the opening. The prongs (3A, 3B) are joined to each other by a base bridge (10) and an end bridge (11). The distance (C) between the base of each barb (4A, 4B) and the main body (2) is preferably selected to be approximately equal to the thickness of the substrate proximate to the opening into which the attachment member (9) is to be inserted.

Figure 4:
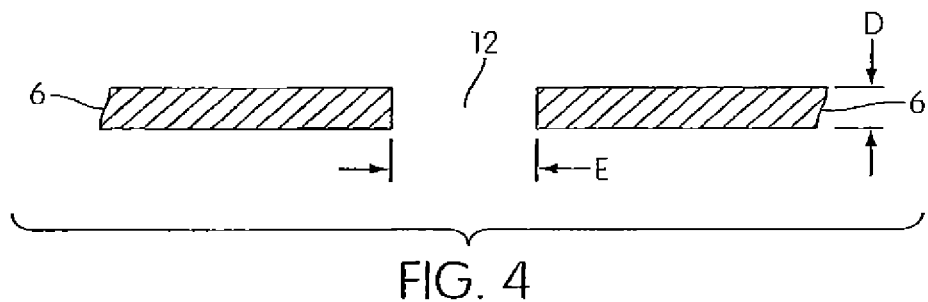
FIG. 4 is a cross-sectional view of a substrate into which the molded polymeric spacing device of FIG. 1 is to be inserted.

FIG. 4 shows, in cross-section, a substrate (6) having an opening (12) and a thickness (D). The opening (12) has a width (E) that is smaller than both the width (B) of the main body (2) and the distance (F) between the tip of one barb (4A) and the tip of the other barb (4B). The opening may be of any suitable or desired shape such as, for example, circular, oval, square, hexagonal, rectangular or even irregular in shape, provided the shape is capable of accommodating insertion of the attachment member of the spacing device. The substrate (6) may, for example, be sheet metal or the like.

Figure 5:
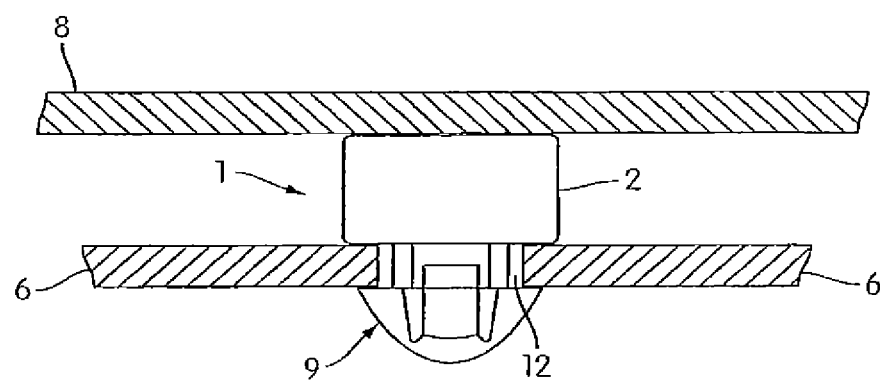
FIG. 5 is a view of the molded polymeric spacing device of FIG. 1 positioned between two substrates, shown in cross-section.

FIG. 5 shows, in cross-section, a molded polymeric spacing device (1) that has been attached to a substrate (6) by means of an attachment member (9). Such attachment is achieved by pushing the prongs (3A, 3B) through opening (12), thereby causing the barbed ends of prongs (3A, 3B) to temporarily bend toward each other. When the barbs (4A, 4B) are clear of the opening (12), prongs (3A, 3B) return to a position substantially parallel to each other such that the barbs (4A, 4B) extend out over the outer surface of substrate (6) near the opening (12). The barbs (4A, 4B) thereby engage such outer surface and hinder withdrawal of the attachment member (9) from the opening (12). A second substrate (8) is placed near and substantially parallel to the first substrate (6), with the main body (2) positioned between substrate (6) and substrate (8). The spacing between substrate (6) and substrate (8) thus is maintained at a distance at least equal to the thickness of the main body (2), as the main body blocks the substrates (6) and (8) from approaching each other any more closely.

Figure 6:
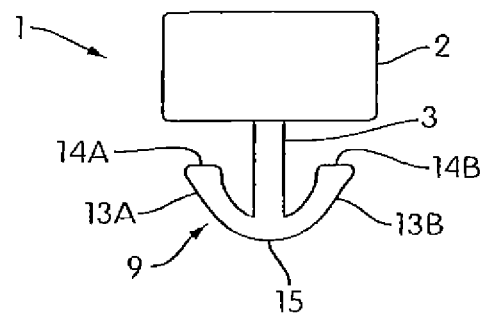
FIG. 6 is a front view of another embodiment of a molded polymeric spacing device in accordance with the present invention.

FIG. 6 illustrates another embodiment of the invention, wherein the molded polymeric spacing device (1) has an attachment member (9) comprised of a prong (3) that extends from the main body (2). Alternatively, prong (3) may extend from a base that is smaller in size than main body (2) and capable of fitting within the substrate opening into which the attachment member (9) is to be inserted. Prong (3) has two barbs (13A, 13B) on opposite sides of said prong which each extend back towards main body (2) and which have ends (14A, 14B) that are capable of being elastically compressed toward each other. The molded polymeric spacing device (1) is attached to a substrate by pushing the head (15) of attachment member (9) through an opening in the substrate that is smaller than the uncompressed width of the attachment member (9) and the width of the main body (2). Ends (14A, 14B) are compressed toward each other while head (15) is being pushed through the substrate opening, but then spring back once clear of the opening. Ends (14A, 14B) extend out over the outer surface of the substrate (i.e., the surface of the substrate opposite the substrate surface against which the main body (2) rests) in the vicinity of the opening and prevent the molded polymeric spacing device from falling out of the opening. In one embodiment, ends (14A, 14) may contain notches that interact with the edges of the opening to help further secure the molded polymeric spacing device in the desired position and orientation.

Figure 7:
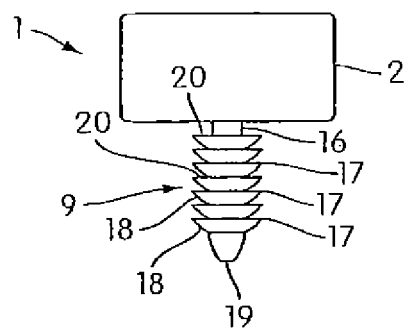
FIG. 7 is a front view of still another embodiment of a molded polymeric spacing device in accordance with the present invention.

In yet another embodiment of the invention (shown in FIG. 7), the attachment member (9) may be comprised of a shaft (16) extending from the main body that has a plurality of axially spaced, flexible branches (17) extending generally laterally therefrom. Branches (17) are of larger diameter than the diameter of the opening in the substrate into which the attachment member (9) is to be inserted, and are sufficiently flexible to permit insertion of the attachment member (9) through such opening. The branches (17) which have passed through the opening will flex back to their original configuration after they exit from the opening. The branches (17) that have not yet entered the opening will remain in their original configuration, while the branches (17) that are generally between the two surfaces of the substrate are somewhat compressed and in at least partial contact with the walls of the opening (thus helping to keep the molded polymeric spacing device in its desired location). Branches (17) may be circular with beveled surfaces (18) on the one side toward the shaft end (19) as shown, or may be laterally extending segments of such circularly formed and beveled branches. The other side surfaces (20) of the branches (17) may be either substantially perpendicular to the axis of the shaft (16) and inwardly beveled so that the branches (17) are effectively conically dished discs or laterally extending segments thereof. In any case, the branches (17) should be sufficiently flexible to bend inwardly as the attachment member is being pushed through the opening during installation, and later to also flex so that they extend out over and engage the outer surface of the substrate in the vicinity of the opening. The beveled surfaces (18) of the branches (17) engage the walls of the opening as the attachment member (9) is being inserted, camming the branches upwardly and inwardly as they flex sufficiently to pass through the opening. Once through the opening and returned to its original shape, the shape of the branch beveled surface (18) resists the reverse movement of the attachment member, thereby helping to keep the molded polymeric spacing device attached to the substrate.

Figure 8:
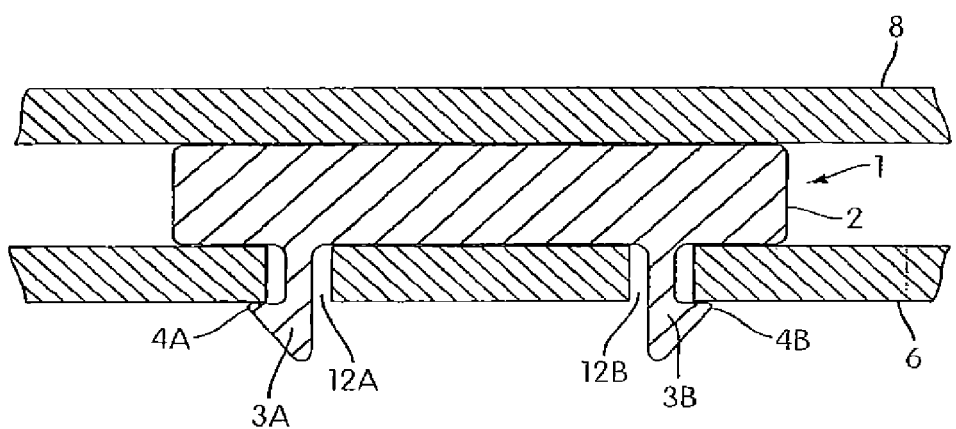
FIG. 8 is a cross-sectional view of another embodiment of the molded polymeric spacing device in accordance with the present invention positioned between two substrates.

In another embodiment of the invention illustrated in FIG. 8, the attachment member of the molded polymeric spacing device (1) may comprise two prongs (3A, 3B) which are spaced further apart from each other than is illustrated in FIGS. 1 and 5 but which similarly extend from the main body (2) and which are capable of being elastically compressed toward each other. A barb (4A, 4B) is present at the end of each prong, with the barbs (4A) and (4B) facing away from each other. A first substrate (6) is provided having two separate openings (12A, 12B). The overall width of each barb (4A, 4B) is somewhat less than the width of openings (12A, 12B) respectively, allowing prong (3A) to be inserted into opening (12A) and allowing prong (3B) to be inserted into opening (12*b*). Prongs (3A, 3B) are sufficiently resilient such that their ends flex towards each other while passing through openings (12A, 12B) but spring back into their original positions once barbs (4A, 4B) have passed through. Barbs (4A, 4B) extend out over the surface of substrate (6) that is opposite to main body (2) in the vicinity of openings (12A, 12B), thereby assisting in holding the spacing device (1) in position and making it resistant to withdrawal from the openings (12A, 12B).

Although the spacing devices illustrated in the figures have a single attachment member, it is also contemplated that a spacing device in accordance with the present invention may comprise two or more attachment members, which may be the same as or different from each other in design.

What is claimed is:

1. A molded polymeric spacing device useful for maintaining a desired minimum spacing between a first substrate having an opening therein and a second substrate and/or damping noise or vibration arising from said first substrate and/or said second substrate, said molded polymeric spacing device comprising a main body with a thickness corresponding to said desired minimum spacing and a width effective to prevent entry of the main body into said opening in said first substrate, an attachment member capable of being inserted into said opening in said first substrate but offering resistance to withdrawal from said opening, and, optionally, a base intermediate between the main body and the attachment member that is capable of entering said opening in said first substrate, said main body and said attachment member being integral with each other and of a single resilient polymeric material which is a rubber, wherein said attachment member is comprised of two prongs extending from said main body and capable of being elastically compressed toward each other, with each prong having a barb at the end of the prong and the distance between said barb and the point at which said prong is attached to the main body is approximately equal to the thickness of the first substrate proximate to said opening, wherein the barbs are capable of extending out over and engaging the outer surface of the first substrate, said prongs are joined to each other by an end bridge, and said prongs and end bridge cooperate to provide said attachment member with an arcuate tip for insertion into said opening.

2. The molded polymeric spacing device of claim 1, wherein said main body and said attachment member are molded as a single piece from the single resilient polymeric material.

3. The molded polymeric spacing device of claim 1, wherein said rubber is a thermoplastic elastomer.

4. The molded polymeric spacing device of claim 1, wherein said rubber comprises a latent blowing agent and is capable of being foamed when heated at the activation temperature of the latent blowing agent, said blowing agent not being activated at a temperature wherein the single resilient polymeric material is to be shaped into the molded polymeric spacing device.

5. The molded polymeric spacing device of claim 1, wherein the base intermediate between the main body and the attachment member that is capable of entering said opening in said first substrate is present in the spacing device.

6. The molded polymeric spacing device of claim 5, wherein the base intermediate between the main body and the attachment member is additionally capable of blocking substantially the entire opening in the first substrate.

7. The molded polymeric spacing device of claim 1, wherein said main body has a thickness of from 1 to 20 mm.

8. The molded polymeric spacing device of claim 1, wherein said molded polymeric spacing device has been injection molded.

9. The molded polymeric spacing device of claim 1, wherein said prongs are additionally joined to each other by a base bridge.

10. A method of maintaining a desired minimum spacing between a first substrate and a second substrate and/or damping noise or vibration arising from said first substrate and/or said second substrate, said method comprising:
   a). providing an opening in said first substrate;
   b). inserting the attachment member of a molded polymeric spacing device in accordance with claim 1 into said opening in said first substrate; and
   c). placing said second substrate in proximity to said first substrate, with said main body positioned between said first substrate and said second substrate.

11. The method of claim 10, wherein said main body and said attachment member are molded as a single piece from the single resilient polymeric material.

12. The method of claim 10, wherein said rubber is a thermoplastic elastomer.

13. The method of claim 10, wherein said rubber comprises a latent blowing agent and is capable of being foamed when heated at the activation temperature of the latent blowing agent, said blowing agent not being activated at a temperature wherein the single resilient polymeric material is to be shaped into the molded polymeric spacing device.

14. The method of claim 10, wherein the base intermediate between the main body and the attachment member that is capable of entering said opening in said first substrate is present in the spacing device.

15. The method of claim 14, wherein the base intermediate between the main body and the attachment member is additionally capable of blocking substantially the entire opening in the first substrate.

16. The method of claim 10, wherein said main body has a thickness of from 1 to 20 mm.

17. The method of claim 10, wherein said molded polymeric spacing device has been injection molded.

18. An assembly comprising a first substrate having an opening and a second substrate having a desired minimum spacing therebetween, wherein:
   a). said assembly further comprises a molded polymeric spacing device in accordance with claim 1; and
   b). said second substrate is proximate to said first substrate, with said main body positioned between said first substrate and said second substrate and the attachment member inserted into the opening.

* * * * *